(12) United States Patent
Koudai et al.

(10) Patent No.: US 12,286,171 B2
(45) Date of Patent: Apr. 29, 2025

(54) STEERING CONTROL DEVICE, VEHICLE POWER SOURCE SYSTEM, AND VEHICLE

(71) Applicants: JTEKT CORPORATION, Kariya (JP); TOYOTA JIDOSHA KABUSHIKI KAISHA, Toyota (JP)

(72) Inventors: Takashi Koudai, Okazaki (JP); Yuji Fujita, Okazaki (JP); Yugo Nagashima, Anjo (JP); Yuuta Kajisawa, Okazaki (JP); Kazuma Hasegawa, Anjo (JP); Yosuke Yamashita, Nagoya (JP); Shintaro Takayama, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 400 days.

(21) Appl. No.: 17/969,785

(22) Filed: Oct. 20, 2022

(65) Prior Publication Data

US 2023/0126878 A1   Apr. 27, 2023

(30) Foreign Application Priority Data

Oct. 26, 2021  (JP) .................................. 2021-174722

(51) Int. Cl.
*B62D 5/04* (2006.01)

(52) U.S. Cl.
CPC ......... *B62D 5/0463* (2013.01); *B62D 5/0481* (2013.01)

(58) Field of Classification Search
CPC .............................. B62D 5/0463; B62D 5/048
See application file for complete search history.

(56) References Cited

U.S. PATENT DOCUMENTS

| 6,007,451 | A | 12/1999 | Matsui et al. |
| 7,374,014 | B2* | 5/2008 | Yasui .................... B60W 10/20 701/41 |
| 2020/0274375 | A1* | 8/2020 | Griffiths .................... H02J 7/24 |
| 2024/0047982 | A1* | 2/2024 | Green ................... B60R 16/033 |

FOREIGN PATENT DOCUMENTS

| EP | 3 705 376 A1 | 9/2020 |
| JP | 2018-103731 A | 7/2018 |
| WO | 2018/123473 A1 | 7/2018 |

OTHER PUBLICATIONS

Mar. 23, 2023 extended Search Report issued in European Patent Application No. 22202947.2.

* cited by examiner

*Primary Examiner* — John Kwon

(57) ABSTRACT

A steering control device includes a controller configured to control driving of a motor that generates a torque. The torque is a torque applied to a steering mechanism of a vehicle using electric power from at least any one of an in-vehicle main power source and an auxiliary power source that backs up the main power source. The controller is configured to wait for the auxiliary power source to be charged to an extent that the main power source is able to be backed up and to permit the vehicle to travel when the controller is activated with an activation operation for the vehicle as a trigger and transitions to a state where control of the motor is executable.

8 Claims, 4 Drawing Sheets

STEERING CONTROL DEVICE, VEHICLE POWER SOURCE SYSTEM, AND VEHICLE

CROSS-REFERENCE TO RELATED APPLICATION

This application claims priority to Japanese Patent Application No. 2021-174722 filed on Oct. 26, 2021, incorporated herein by reference in its entirety.

BACKGROUND

1. Technical Field

The present disclosure relates to a steering control device, a vehicle power source system, and a vehicle.

2. Description of Related Art

A steer-by-wire steering device is known in which power transmission between a steering wheel and turning wheels is separated. For example, a steering device disclosed in Japanese Unexamined Patent Application Publication No. 2018-103731 (JP 2018-103731 A) includes a steering unit including a steering reaction force actuator, a turning unit including a turning actuator, and an electromagnetic clutch that connects or separates the steering unit and the turning unit.

Electric power is supplied to the steering reaction force actuator and the turning actuator from an in-vehicle power source device. The power source device has a battery and a generator. When a state of a battery is not normal, the battery is not sufficiently charged and thus quick electric power supply is difficult for the generator. For this reason, the electric power requested for the turning actuator may not be supplied, for example.

Therefore, the steering device connects the electromagnetic clutch when the state of the battery is not normal. Since the power can be transmitted between the steering unit and the turning unit, the turning wheels can be turned by drive force of the turning actuator and operation force of the steering wheel. Accordingly, the operation of the steering wheel is assisted by the drive force of the turning actuator while the steering device suppresses electric power consumption.

SUMMARY

From the viewpoint of ensuring the reliability of the operation of the steering device, an auxiliary power source may be provided for backing up electric power supply to the steering reaction force actuator and the turning actuator according to the state of the battery. When the vehicle travels, a state is requested in which the backup by the auxiliary power source is possible.

A first aspect of the present disclosure is a steering control device. The steering control device includes a controller configured to control driving of a motor that generates a torque. The torque is a torque applied to a steering mechanism of a vehicle using electric power from at least any one of an in-vehicle main power source and an auxiliary power source that backs up the main power source. The controller is configured to wait for the auxiliary power source to be charged to an extent that the main power source is able to be backed up and to permit the vehicle to travel when the controller is activated with an activation operation for the vehicle as a trigger and transitions to a state where control of the motor is executable.

With the above configuration, the vehicle is not permitted to travel until the auxiliary power source is charged to the extent that the main power source can be backed up. Therefore, it is possible to avoid the traveling start of the vehicle in a state where the auxiliary power source cannot back up the main power source.

In the steering control device, the controller may be configured to permit the charge of the auxiliary power source when the controller transitions to the state where the control of the motor is executable. With the above configuration, it is possible to suppress the traveling permission for the vehicle even though the controller is not in the state where the control of the motor can be executed.

In the steering control device, the main power source may be configured to be charged with electric power generated by an in-vehicle generator, and the auxiliary power source is configured to be charged with the electric power from the main power source. The controller may be configured to be activated with the activation operation for the vehicle as a trigger and then to transition to the state where the control of the motor is executable with a start of the power generation by the generator as a trigger.

With the above configuration, the charge of the auxiliary power source is started after the power generation is started. Therefore, consumption of the main power source can be suppressed.

A second aspect of the present disclosure is a power source system. The power source system includes a main power source mounted on a vehicle, an auxiliary power source configured to back up the main power source, and a steering control device including a controller configured to control driving of a motor that generates a torque. The torque is a torque applied to a steering mechanism of the vehicle using electric power from at least any one of the in-vehicle main power source and the auxiliary power source that backs up the main power source. The controller is configured to wait for the auxiliary power source to be charged to an extent that the main power source is able to be backed up and to permit the vehicle to travel when the controller is activated with an activation operation for the vehicle as a trigger and transitions to a state where control of the motor is executable.

With the above configuration, by providing the steering control device, it is possible to avoid the traveling start of the vehicle in a state where the auxiliary power source cannot back up the main power source.

The power source system may further include a monitoring circuit configured to monitor a charge state of the auxiliary power source and to determine whether or not the charge state of the auxiliary power source is a state where the main power source is able to be backed up. The controller may be configured to recognize whether or not the auxiliary power source is charged to the extent that the main power source is able to be backed up, based on a determination result of the monitoring circuit.

With the above configuration, the monitoring circuit determines whether or not the charge state of the auxiliary power source is the state where the main power source can be backed up. Since the controller does not need to monitor the charge state of the auxiliary power source, the calculation load of the controller can be reduced by that much.

A third aspect of the present disclosure is a vehicle. The vehicle includes an operation apparatus operated when the vehicle travels, a vehicle control device configured to control the vehicle based on the operation of the operation apparatus, and a power source system. The power source system includes a main power source mounted on the vehicle, an auxiliary power source configured to back up the main power source, and a steering control device including a controller configured to control driving of a motor that generates a torque. The torque is a torque applied to a steering mechanism of the vehicle using electric power from at least any one of the in-vehicle main power source and the auxiliary power source that backs up the main power source. The controller is configured to wait for the auxiliary power source to be charged to an extent that the main power source is able to be backed up and to permit the vehicle to travel when the controller is activated with an activation operation for the vehicle as a trigger and transitions to a state where control of the motor is executable. The vehicle control device is configured to lock or disable the operation of the operation apparatus when the steering control device does not permit the vehicle to travel.

With the above configuration, when the steering control device does not permit the vehicle to travel, the operation of the operation apparatus is locked or disabled. Therefore, when the steering control device does not permit the vehicle to travel, that is, when the auxiliary power source is not charged to the extent that the main power source can be backed up, the vehicle does not start to travel.

In the vehicle, the operation apparatus may be a shift lever that is operated when a shift range of a transmission mounted on the vehicle is switched. With the above configuration, when the steering control device does not permit the vehicle to travel, the operation of the shift lever is locked or disabled. Therefore, when the steering control device does not permit the vehicle to travel, that is, when the auxiliary power source is not charged to the extent that the main power source can be backed up, the vehicle does not start to travel.

The vehicle may further include an indicator. The vehicle control device may be configured to light the indicator when the steering control device does not permit the vehicle to travel.

With the above configuration, the driver can recognize whether or not the vehicle is in the state of being permitted to travel by visually recognizing the indicator.

According to the aspects of the present disclosure, the reliability of an operation of a control target can be ensured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
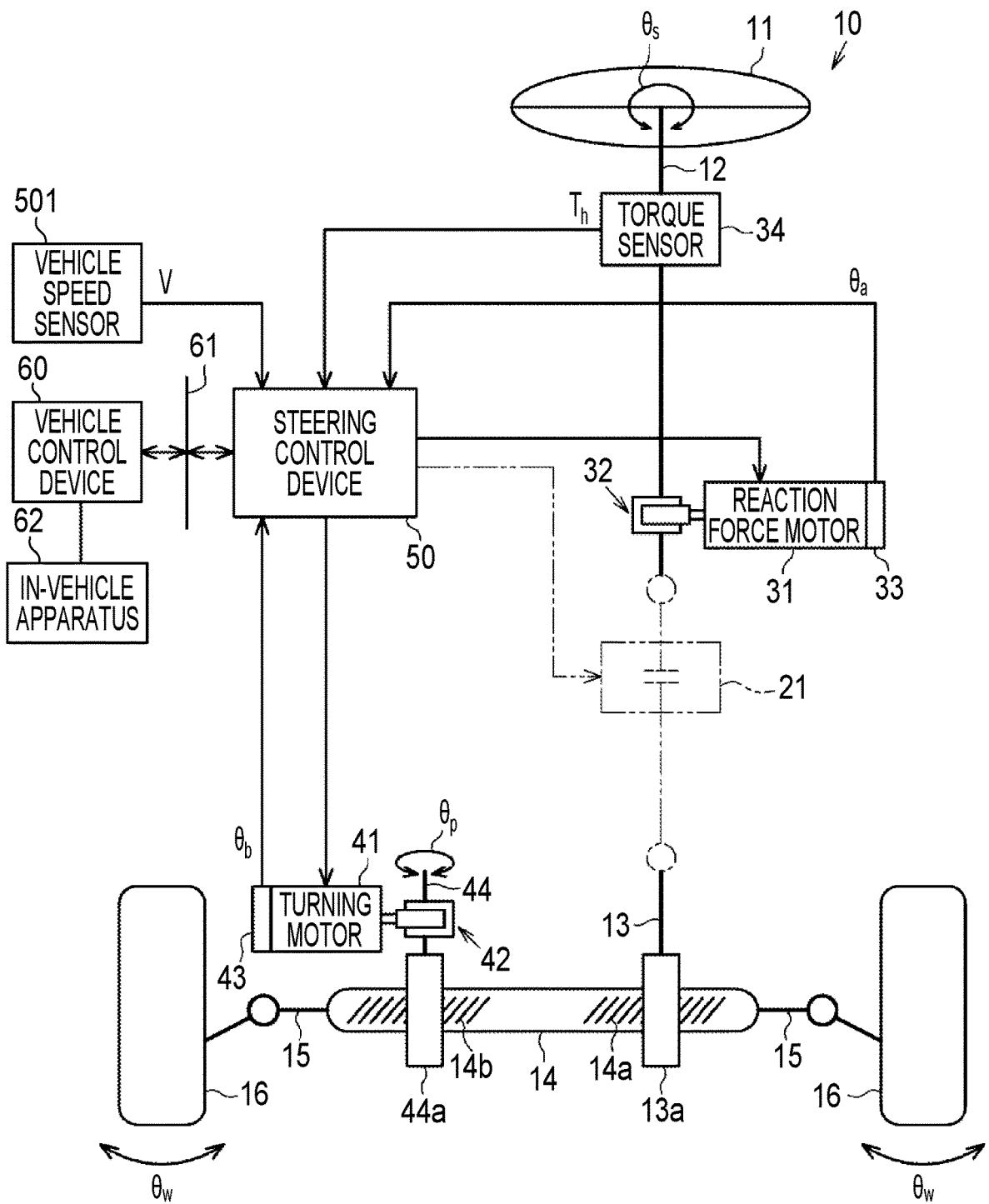
FIG. 1 is a configuration diagram of a steer-by-wire steering device equipped with an embodiment of a steering control device.

An embodiment in which a steering control device is embodied as a steer-by-wire steering device will be described. As shown in FIG. 1, a steering device 10 of a vehicle has a steering shaft 12 connected to a steering wheel 11. The steering device 10 also has a turning shaft 14 extending along a vehicle width direction (right and left direction in FIG. 1). Right and left turning wheels 16 are respectively connected to both ends of the turning shaft 14 via tie rods 15. With linear movement of the turning shaft 14, a turning angle $\theta_w$ of the turning wheels 16 is changed. The steering shaft 12 and the turning shaft 14 constitute a steering mechanism of the vehicle.

Configuration for Generating Steering Reaction Force: Reaction Force Unit

The steering device 10 has a reaction force motor 31, a speed reduction mechanism 32, a rotation angle sensor 33, and a torque sensor 34 as a configuration for generating the steering reaction force. The steering reaction force is a force acting in a direction opposite to a direction in which the steering wheel 11 is operated by a driver. With the steering reaction force applied to the steering wheel 11, an appropriate feeling of response can be given to the driver.

The reaction force motor 31 is a source of generating the steering reaction force. A three-phase brushless motor, for example, is employed as the reaction force motor 31. The reaction force motor 31 has two winding groups. The winding group of a first system and the winding group of a second system are wound on a common stator. Electrical characteristics of the winding group of the first system and the winding group of the second system are the same. A rotation shaft of the reaction force motor 31 is connected to the steering shaft 12 via a speed reduction mechanism 32. A torque of the reaction force motor 31 is applied to the steering shaft 12 as the steering reaction force. The torque of the reaction force motor 31 is the drive force applied to the steering shaft 12. The rotation angle sensor 33 is provided in the reaction force motor 31.

The rotation angle sensor 33 detects a rotation angle $\theta_a$ of the reaction force motor 31. The rotation angle $\theta_a$ of the reaction force motor 31 is used to calculate a steering angle $\theta_s$. The reaction force motor 31 and the steering shaft 12 are interlocked via the speed reduction mechanism 32. Therefore, there is a correlation between the rotation angle $\theta_a$ of the reaction force motor 31, the rotation angle of the steering shaft 12, and the steering angle $\theta$, that is the rotation angle of the steering wheel 11. Therefore, the steering angle $\theta_s$ can be obtained based on the rotation angle $\theta_a$ of the reaction force motor 31.

The torque sensor 34 detects a steering torque $T_h$. The steering torque $T_h$ is a torque applied to the steering shaft 12 through a rotation operation of the steering wheel 11. The torque sensor 34 detects the steering torque $T_h$ applied to the steering shaft 12 based on a twist amount of a torsion bar provided in the middle of the steering shaft 12. The torque sensor 34 is provided at a portion of the steering shaft 12 between the speed reduction mechanism 32 and the steering wheel 11.

Configuration for Generating Turning Force: Turning Unit

The steering device 10 has a turning motor 41, a speed reduction mechanism 42, and a rotation angle sensor 43 as a configuration for generating turning force that is power for turning the turning wheels 16.

The turning motor 41 is a source of generating the turning force. A three-phase brushless motor, for example, is employed as the turning motor 41. The turning motor 41 has two winding groups. The winding group of a first system and the winding group of a second system are wound on a common stator. Electrical characteristics of the winding group of the first system and the winding group of the second system are the same. A rotation shaft of the turning motor 41 is connected to a pinion shaft 44 via the speed reduction mechanism 42.

Pinion teeth 44a of the pinion shaft 44 are engaged with rack teeth 14 *b* of the turning shaft 14. A torque of the turning motor 41 is applied to the turning shaft 14 via the pinion shaft 44 as the turning force. The torque of the turning motor 41 is the drive force applied to the turning shaft 14. As the turning motor 41 rotates, the turning shaft 14 moves along the vehicle width direction, which is the right and left direction in FIG. 1.

The rotation angle sensor 43 is provided in the turning motor 41. The rotation angle sensor 43 detects a rotation angle $θ_b$ of the turning motor 41. The steering device 10 has a pinion shaft 13. The pinion shaft 13 is provided to cross the turning shaft 14. Pinion teeth 13a of the pinion shaft 13 are engaged with rack teeth 14a of the turning shaft 14. The reason for providing the pinion shaft 13 is to support the turning shaft 14 together with the pinion shaft 44 inside a housing (not shown). That is, with a support mechanism (not shown) provided in the steering device 10, the turning shaft 14 is movably supported along an axial direction thereof and pressed toward the pinion shafts 13, 44. Accordingly, the turning shaft 14 is supported inside the housing. However, another support mechanism to support the turning shaft 14 on the housing may be provided without using the pinion shaft 13.

Steering Control Device

The steering device 10 has a steering control device 50. The steering control device 50 controls the reaction force motor 31 and the turning motor 41 based on detection results of various in-vehicle sensors. The sensors include a vehicle speed sensor 501 in addition to the rotation angle sensor 33, the torque sensor 34, and the rotation angle sensor 43 described above. The vehicle speed sensor 501 detects a vehicle speed V.

The steering control device 50 executes reaction force control to generate the steering reaction force according to the steering torque $T_h$ through the control of the reaction force motor 31. The steering control device 50 calculates a target steering reaction force based on the steering torque $T_h$ and the vehicle speed V, and calculates a steering reaction force command value based on the calculated target steering reaction force. The steering control device 50 supplies the reaction force motor 31 with a current requested to generate the steering reaction force according to the steering reaction force command value.

The steering control device 50 executes steering control to turn the turning wheels 16 according to a steering state through the control of the turning motor 41. The steering control device 50 calculates a pinion angle $θ_p$ based on the rotation angle $θ_b$ of the turning motor 41 detected by the rotation angle sensor 43. The pinion angle $θ_p$ is an actual rotation angle of the pinion shaft 44 and is a value reflecting the turning angle $θ_w$ of the turning wheels 16. Further, the steering control device 50 calculates the steering angle θ, based on the rotation angle $θ_a$ of the reaction force motor 31 detected by the rotation angle sensor 33, and calculates a target pinion angle, which is a target value of the pinion angle $θ_p$, based on the calculated steering angle $θ_s$. The steering control device 50 obtains a deviation between the target pinion angle and the actual pinion angle $θ_p$, and controls electric power supply to the turning motor 41 to eliminate the deviation.

The steering control device 50 and an in-vehicle vehicle control device 60 are interconnected via an in-vehicle network 61. The in-vehicle network 61 is, for example, a controller area network (CAN). The steering control device 50 and the in-vehicle vehicle control device 60 exchange information with each other via the in-vehicle network 61. The vehicle control device 60 controls an in-vehicle apparatus 62. The in-vehicle apparatus 62 includes a shift lever and a shift lock mechanism. The shift lock mechanism is a mechanism that switches between locking and unlocking of the shift lever. The shift lever is an operation apparatus that is operated when the vehicle travels, and is operated when a shift range of the transmission is switched. The vehicle control device 60 unlocks the shift lever when a drive source for traveling of the vehicle is started and then a foot brake is depressed. Accordingly, the shift lever can be moved from a parking position (P).

Detailed Configuration of Steering Control Device

Figure 2:
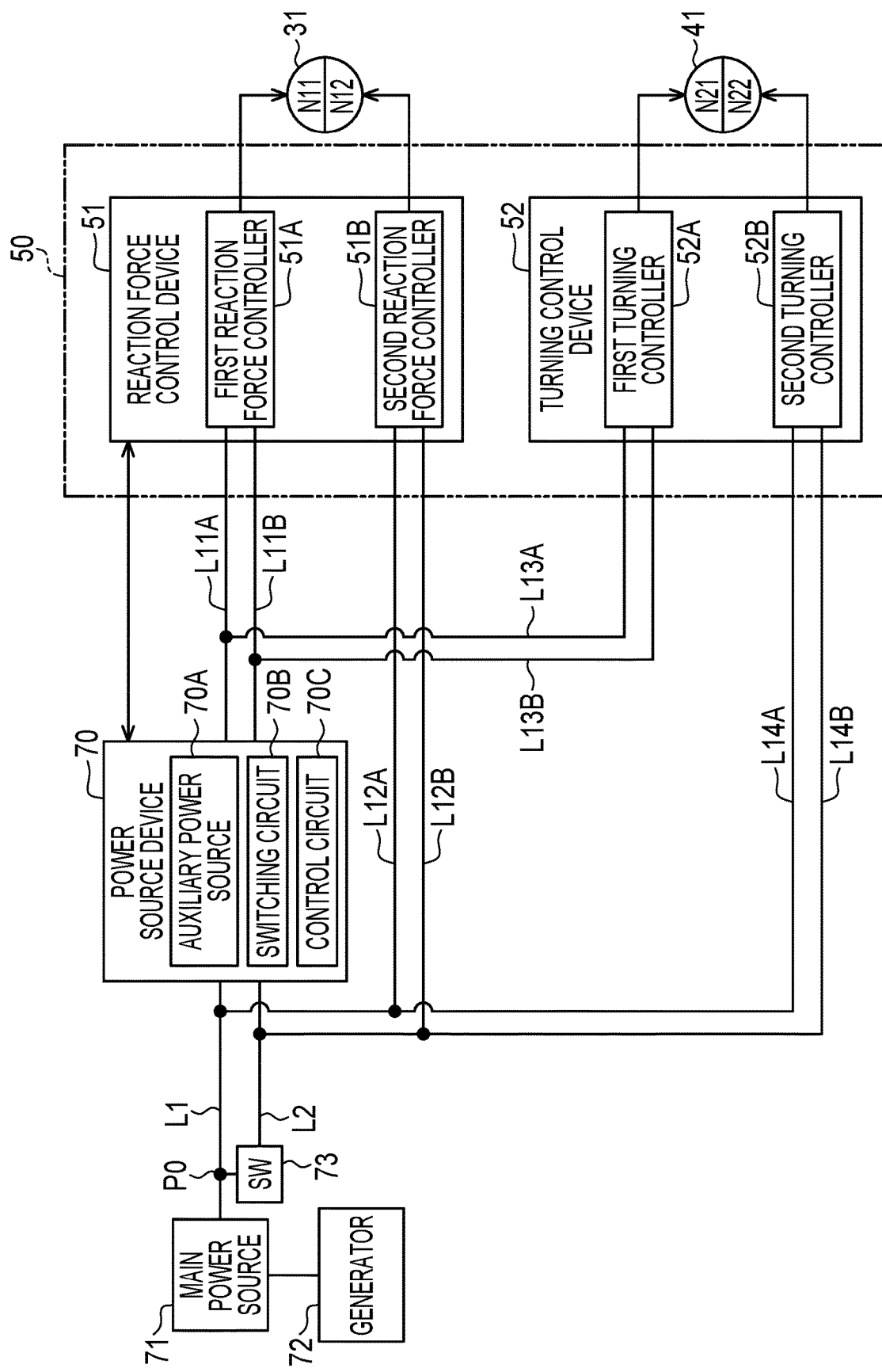
FIG. 2 is a block diagram of a power source system including the steering control device and a power source device according to an embodiment.

Next, a configuration of the steering control device 50 will be described in detail. As shown in FIG. 2, the steering control device 50 includes a reaction force control device 51 and a turning control device 52. The reaction force control device 51 controls the electric power supply to the reaction force motor 31. The turning control device 52 controls the electric power supply to the turning motor 41. The reaction force control device 51 and the turning control device 52 exchange information with each other via a local network such as serial communication.

The reaction force control device 51 has a first reaction force controller 51A and a second reaction force controller 51B. The first reaction force controller 51A controls the electric power supply to a winding group N11 of the first system in the reaction force motor 31. The second reaction force controller 51B controls the electric power supply to a winding group N12 of the second system in the reaction force motor 31.

The first reaction force controller 51A is configured of a processing circuit including (1) one or more processors that operate in accordance with a computer program (software), (2) one or more dedicated hardware circuits, such as an application-specific integrated circuit (ASIC), that execute at least some of various types of processing, and (3) a combination thereof. The processor includes a central processing unit (CPU). The processor also includes memories, such as a random-access memory (RAM) and a read-only memory (ROM). The memory stores a program code or a command configured to cause the CPU to execute the processing. The memory, that is, non-transitory computer-readable medium includes any available medium that can be accessed by a general-purpose or dedicated computer.

The first reaction force controller 51A calculates the target steering reaction force to be generated in the reaction force motor 31 based on the steering torque $T_h$ detected by the torque sensor 34, and calculates a first current command value for the winding group N11 of the first system according to a value of the calculated target steering reaction force. However, the first current command value is set to a value of half (50%) of a current amount (100%) requested to cause the reaction force motor 31 to generate the target steering reaction force. The first reaction force controller 51A supplies the current according to the first current command value to the winding group N11 of the first system. Accordingly, the winding group N11 of the first system generates a torque according to the first current command value.

The second reaction force controller 51B basically has the same configuration as the first reaction force controller 51A. The second reaction force controller 51B calculates the target steering reaction force to be generated in the reaction force motor 31 based on the steering torque $T_h$ detected by the torque sensor 34, and calculates a second current command value for the winding group N12 of the second system according to the value of the calculated target steering reaction force. However, the second current command value is set to the value of half of the current amount requested to cause the reaction force motor 31 to generate the target steering reaction force. The second reaction force controller 51B supplies the current according to the second current command value to the winding group N12 of the second system. Accordingly, the winding group N12 of the second system generates a torque according to the second current command value.

Depending on product specifications, there may be a master-slave relationship between the first reaction force controller 51A and the second reaction force controller 51B. In this case, for example, the first reaction force controller 51A may function as a master, and the second reaction force controller 51B may function as a slave. Further, depending on product specifications, the first reaction force controller 51A and the second reaction force controller 51B may have an equal relationship.

The first reaction force controller 51A and the second reaction force controller 51B can exchange information with each other via a local network. Further, the first reaction force controller 51A and the second reaction force controller 51B can exchange the information with each other via the in-vehicle network 61.

The turning control device 52 has a first turning controller 52A and a second turning controller 52B. The first turning controller 52A controls the electric power supply to a winding group N21 of the first system in the turning motor 41. The second turning controller 52B controls the electric power supply to a winding group N22 of the second system in the turning motor 41.

The first turning controller 52A basically has the same configuration as the first reaction force controller 51A. The first turning controller 52A calculates the target pinion angle, which is the target value of the pinion angle $θ_p$, based on the steering angle $θ$, calculated by the first reaction force controller 51A, for example. The first turning controller 52A calculates the pinion angle $θ_p$ based on the rotation angle $θ_b$ of the turning motor 41 detected by the rotation angle sensor 43. The first turning controller 52A calculates a target turning force to be generated in the turning motor 41 through execution of angle feedback control that causes the pinion angle $θ_p$ to follow a target pinion angle, and calculates a third current command value for the winding group N21 of the first system according to a value of the calculated target turning force. However, the third current command value is set to a value of half (50%) of a current amount requested to cause the turning motor 41 to generate the target turning force. The first turning controller 52A supplies the current according to the third current command value to the winding group N21 of the first system. Accordingly, the winding group N21 of the first system generates a torque according to the third current command value.

The second turning controller 52B basically has the same configuration as the first turning controller 52A. The second turning controller 52B calculates the target pinion angle, which is the target value of the pinion angle $θ_p$, based on the steering angle $θ_s$ calculated by the second reaction force controller 51B, for example. The second turning controller 52B calculates the pinion angle $θ_p$ based on the rotation angle $θ_b$ of the turning motor 41 detected by the rotation angle sensor 43. The second turning controller 52B calculates the target turning force to be generated in the turning motor 41 through the execution of angle feedback control that causes the pinion angle $θ_p$ to follow the target pinion angle, and calculates a fourth current command value for the winding group N22 of the second system according to the value of the calculated target turning force. However, the fourth current command value is set to the value of half (50%) of the current amount requested to cause the turning motor 41 to generate the target turning force. The second turning controller 52B supplies the current according to the fourth current command value to the winding group N22 of the second system. Accordingly, the winding group N22 of the second system generates a torque according to the fourth current command value.

Depending on product specifications, there may be a master-slave relationship between the first turning controller 52A and the second turning controller 52B. In this case, for example, the first turning controller 52A may function as a master, and the second turning controller 52B may function as a slave. Further, depending on product specifications, the first turning controller 52A and the second turning controller 52B may be in an equal relationship.

The first turning controller 52A and the second turning controller 52B can exchange information with each other via a local network. The first turning controller 52A and the second turning controller 52B can exchange the information with each other via the in-vehicle network 61. The first turning controller 52A and the first reaction force controller 51A can exchange information with each other via a local network. The second turning controller 52B and the second reaction force controller 51B can exchange information with each other via a local network.

Electric Power Supply Path

Next, an electric power supply path for the steering control device 50 will be described. As shown in FIG. 2, the steering control device 50 is connected to an in-vehicle main power source 71 via a power source device 70. The main power source 71 is, for example, a battery that is a direct-current power source. The steering control device 50 operates by consuming electric power from the main power source 71 supplied via the power source device 70. The main power source 71 is connected to a generator 72 such as an alternator. The generator 72 uses rotation of an engine, which is the drive source for traveling of the vehicle, as a power source to generate the electric power. Alternating-current electric power generated by the generator 72 is converted into direct-current electric power and stored in the main power source 71.

The power source device 70 is connected to the main power source 71 via two power source lines L1, L2. The power source line L2 is branched from a connection point P0 of the power source line L1. An activation switch 73 is provided on the power source line L2. The activation switch 73 is, for example, an ignition switch or a power switch. The activation switch 73 is operated when the drive source for traveling of the vehicle is started or stopped.

The first reaction force controller 51A is connected to the main power source 71 via the power source device 70. The first reaction force controller 51A is connected to the power source line L1 via a power source line L11A and the power source device 70. Further, the first reaction force controller 51A is connected to the power source line L2 via a power source line L11B and the power source device 70.

The electric power of the main power source 71 is supplied to a power circuit of the first reaction force controller 51A via the power source line L11A. The power circuit is an electric circuit that handles larger electric power and includes, for example, an inverter that converts the direct-current electric power of the main power source 71 to the alternating-current electric power. Further, the electric power of the main power source 71 is supplied to a control circuit of the first reaction force controller 51A via the power source line L11B. The control circuit is an electric circuit for controlling the reaction force motor 31 and includes, for example, a CPU and a memory.

The second reaction force controller 51B is connected to the main power source 71 not via the power source device 70. The second reaction force controller 51B is connected to the power source line L1 via the power source line L12A. Further, the second reaction force controller 51B is connected to the power source line L2 via the power source line L12B. The electric power of the main power source 71 is supplied to a power circuit of the second reaction force controller 51B via the power source line L12A. Further, the electric power of the main power source 71 is supplied to a control circuit of the second reaction force controller 51B via the power source line L12B.

The first turning controller 52A is connected to the main power source 71 via the power source device 70. The first turning controller 52A is connected to the power source line L11A via a power source line L13A. Further, the first turning controller 52A is connected to the power source line L11B via a power source line L13B. The electric power of the main power source 71 is supplied to a power circuit of the first turning controller 52A via the power source line L13A. Further, the electric power of the main power source 71 is supplied to a control circuit of the first turning controller 52A via the power source line L13B.

The second turning controller 52B is connected to the main power source 71 not via the power source device 70. The second turning controller 52B is connected to the power source line L1 via a power source line L14A. Further, the second turning controller 52B is connected to the power source line L2 via a power source line L14B. The electric power of the main power source 71 is supplied to a power circuit of the second turning controller 52B via the power source line L14A. Further, the electric power of the main power source 71 is supplied to a control circuit of the second turning controller 52B via the power source line L14B.

The main power source 71, the power source device 70, and the steering control device 50 constitute a vehicle power source system.

Power Source Device

Next, a configuration of the power source device 70 will be described. The power source device 70 has an auxiliary power source 70A, a switching circuit 70B, and a control circuit 70C. The auxiliary power source 70A is a power storage device that is chargeable and dischargeable a charge and employs a capacitor, for example. A voltage of auxiliary power source 70A is set, for example, to a value that is higher than a lower limit value of a voltage requested to properly operate the steering control device 50 and is lower than a voltage of main power source 71.

Based on a command from the control circuit 70C, the switching circuit 70B switches a connection state of the auxiliary power source 70A to the power source line L1 such that the auxiliary power source 70A is charged. Further, based on the command from the control circuit 70C, the switching circuit 70B switches the power source of the first reaction force controller 51A and the first turning controller 52A between the main power source 71 and the auxiliary power source 70A.

The electric power of the main power source 71 or the electric power of the auxiliary power source 70A switched by the switching circuit 70B is supplied to the first reaction force controller 51A via the power source lines L11A, L11B. Further, the electric power of the main power source 71 or the electric power of the auxiliary power source 70A switched by the switching circuit 70B is supplied to the first turning controller 52A via the power source lines L13A, L13B.

The control circuit 70C controls the switching of the switching circuit 70B. Further, the control circuit 70C monitors the voltage of the main power source 71. The control circuit 70C determines that the voltage of the main power source 71 is reduced when the voltage of the main power source 71 is lower than a threshold voltage. The threshold voltage is a reference when the voltage reduction of the main power source 71 is determined, and is set with a lower limit value of the voltage requested to properly operate the reaction force motor 31, the turning motor 41, the first reaction force controller 51A, and the first turning controller 52A as a reference.

The control circuit 70C generates a first command to the switching circuit 70B when the voltage reduction of the main power source 71 is not detected. The first command is a command for switching the power source of the first reaction force controller 51A and the first turning controller 52A to the main power source 71. Further, the first command is also a command for switching the connection state of the auxiliary power source 70A to the power source line L1 such that the auxiliary power source 70A is charged.

The control circuit 70C generates a second command to the switching circuit 70B when the voltage reduction of the main power source 71 is detected. The second command is a command for switching the power source of the first reaction force controller 51A and the first turning controller 52A from the main power source 71 to the auxiliary power source 70A. The second command is also a command for switching the connection state of the auxiliary power source 70A to the power source line L1 such that the connection between the power source line L1 and the auxiliary power source 70A is cut off and the auxiliary power source 70A is not charged.

The control circuit 70C detects a charge amount in the auxiliary power source 70A. The control circuit 70C detects the voltage of the auxiliary power source 70A by a voltage sensor provided in the auxiliary power source 70A, and detects the charge amount in the auxiliary power source 70A based on the detected voltage. When the auxiliary power source 70A is a capacitor, the control circuit 70C detects the charge amount in the capacitor based on a voltage between terminals of the capacitor. The control circuit 70C also functions as a monitoring circuit that monitors a charge state of the auxiliary power source 70A.

Comparative Example of Activation Sequence

Next, a comparative example of an activation sequence executed with turn-on of the activation switch 73 as a trigger will be described. The activation sequence is a series of pieces of processing executed when the vehicle control device 60, the steering control device 50, and the power source device 70 are activated.

However, the vehicle control device 60, the steering control device 50, and the power source device 70 can detect an on or off state of activation switch 73 by monitoring voltages of both ends of the activation switch 73, for example. The turn-on of the activation switch 73 means turn-on of a vehicle power source. Turn-off of the activation switch 73 means turn-off of the vehicle power source.

Figure 3:
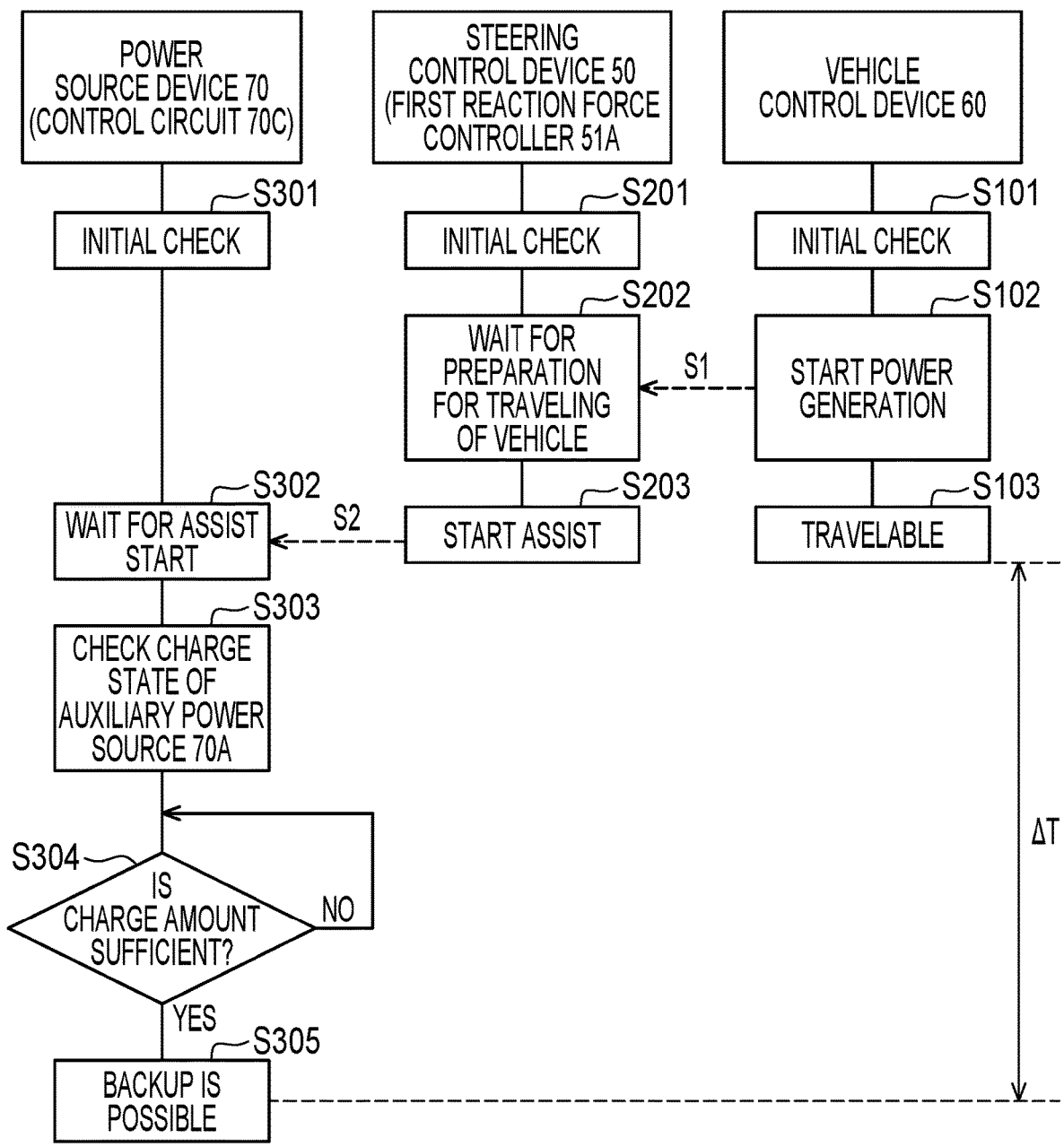
FIG. 3 is a sequence diagram showing processing procedures of the power source device, the steering control device, and a vehicle control device in a comparative example.

As shown in a sequence diagram of FIG. 3, the vehicle control device 60 executes an initial check when the activation switch 73 is turned on (step S101). The initial check is a series of pieces of processing requested for the vehicle system to operate. The initial check includes, for example, a hardware check, central processing unit (CPU) initialization, and initialization of a variable or a flag. When the execution of the initial check is completed and then the start of the electric power generation by the generator 72 is detected as the drive source for traveling of the vehicle is started (step S102), for example, the vehicle control device 60 transmits an assist start permission signal S1 to the first reaction force controller 51A of the steering control device 50. When the start of the electric power generation by the generator 72 is detected (step S102), the vehicle control device 60 recognizes that the vehicle is in a travelable state (step S103).

The first reaction force controller 51A executes the initial check when the activation switch 73 is turned on (step S201). After the execution of the initial check is completed, the first reaction force controller 51A waits for completion of preparation for traveling of the vehicle (step S202). The first reaction force controller 51A transitions to an assist start state when the assist start permission signal S1 is received in the state of waiting for the completion of preparation for traveling of the vehicle (step S203). The assist start state is a state where the reaction force control through the reaction force motor 31 can be executed. The first reaction force controller 51A transmits a charge start permission signal S2 to the control circuit 70C of the power source device 70 when the transition to the assist start state is performed (step S203).

The transition of the state of the first reaction force controller 51A to the assist start state is transmitted to the second reaction force controller 51B, the first turning controller 52A, and the second turning controller 52B. Therefore, at a timing when the state of the first reaction force controller 51A transitions to the assist start state, states of the second reaction force controller 51B, the first turning controller 52A, and the second turning controller 52B also transition to the assist start state.

The control circuit 70C of the power source device 70 executes the initial check when the activation switch 73 is turned on (step S301). After the execution of the initial check is completed, the control circuit 70C waits for the transition of the state of the first reaction force controller 51A to the assist start state (step S302). When the charge start permission signal S2 is received in a state of waiting for the transition of the state of the first reaction force controller 51A to the assist start state, the control circuit 70C checks the charge state of the auxiliary power source 70A (step S303) and determines whether or not the charge amount in the auxiliary power source 70A is sufficient to back up the main power source 71 (step S304).

The control circuit 70C detects the charge amount in the capacitor, for example, based on the voltage between the terminals of the capacitor, which is the auxiliary power source 70A. When a value of the voltage between the terminals of the capacitor is smaller than the threshold voltage, the control circuit 70C determines that the charge amount in the auxiliary power source 70A is insufficient. When the value of the voltage between the terminals of the capacitor is equal to or higher than the threshold voltage, the control circuit 70C determines that the charge amount in the auxiliary power source 70A is sufficient. The threshold voltage is a reference when determination is made whether or not the charge amount in the auxiliary power source 70A is sufficient. The threshold voltage is set with the lower limit value of the voltage requested to properly operate the reaction force motor 31, the turning motor 41, the first reaction force controller 51A, and the first turning controller 52A as a reference.

When determination is made that the charge amount in the auxiliary power source 70A is not sufficient (NO in step S304), the control circuit 70C starts to charge the auxiliary power source 70A and waits until the charge amount in the auxiliary power source 70A reaches a sufficient amount. When determination is made that the charge amount in the auxiliary power source 70A is sufficient (YES in step S304), the control circuit 70C recognizes that there is a state where the main power source 71 can be backed up (step S305).

However, when the activation sequence of the comparative example shown in FIG. 3 is employed, there are concerns about the following. That is, with the reception of the charge start permission signal S2 from the steering control device 50 (here, first reaction force controller 51A) as a trigger after the generator 72 of the vehicle starts the electric power generation and the vehicle is in the travelable state, the control circuit 70C of the power source device 70 starts to charge the auxiliary power source 70A. Then, the charge state of the auxiliary power source 70A reaches a charge state to the extent that the main power source 71 can be backed up.

Since a state where the power source cannot be backed up due to an insufficient charge amount in the auxiliary power source 70A at activation is not an abnormal state, the vehicle can travel. However, although the vehicle can travel, there is a concern that there is a period ΔT during which the auxiliary power source 70A cannot back up the main power source 71. From the viewpoint of ensuring the reliability of the operation of the steering device 10, the state is requested in which the main power source 71 can be backed up by the auxiliary power source 70A when the vehicle travels. In the present embodiment, the following activation sequence is employed.

Example of Activation Sequence

Figure 4:
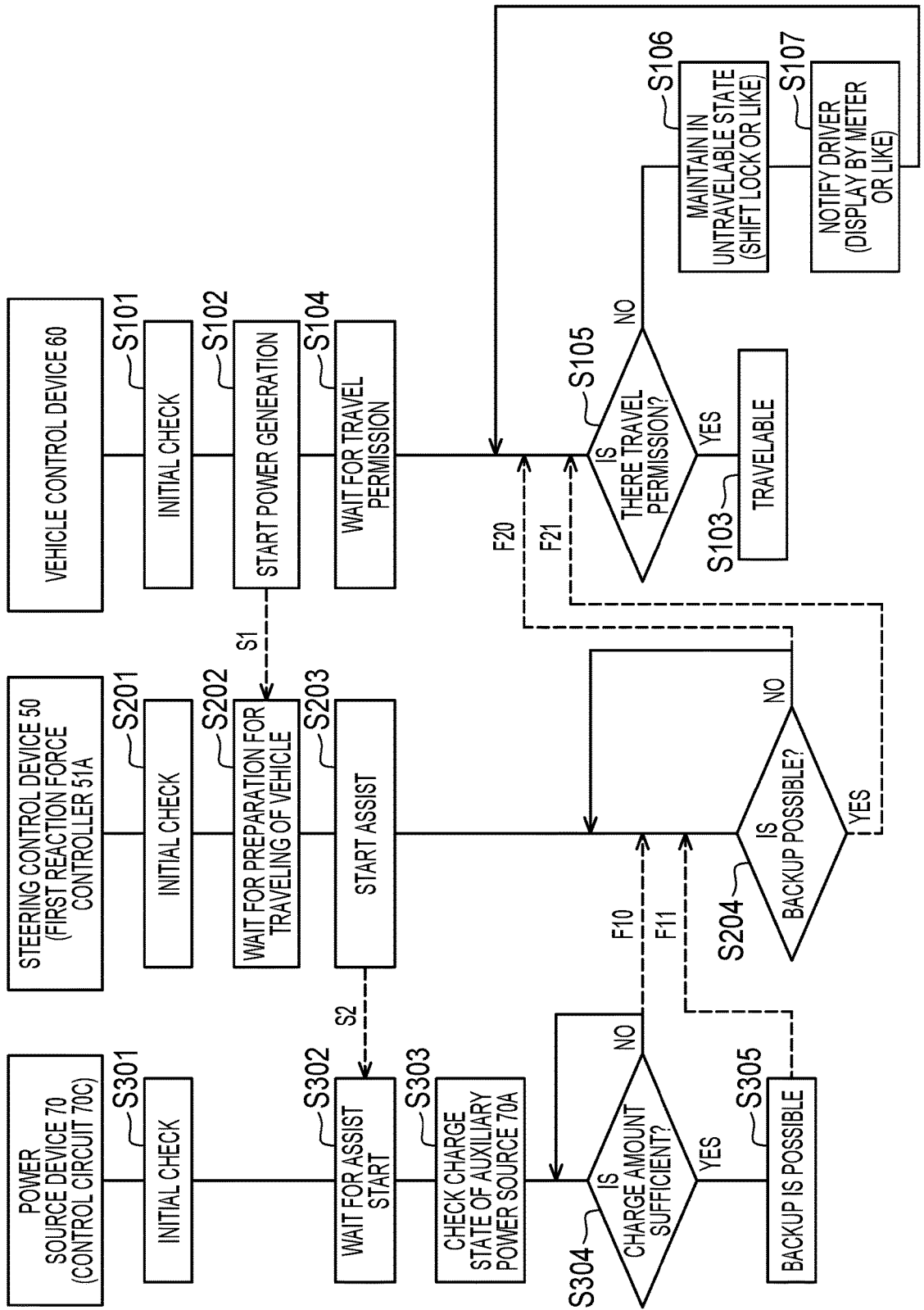
FIG. 4 is a sequence diagram showing processing procedures of a control circuit of the power source device, the steering control device, and the vehicle control device according to an embodiment.

Next, the activation sequence of the present embodiment will be described. As shown in a sequence diagram of FIG. 4, the vehicle control device 60 executes the initial check when the activation switch 73 is turned on (step S101). When the execution of the initial check is completed and then the start of the electric power generation by the generator 72 is detected as the drive source for traveling of the vehicle is started (step S102), for example, the vehicle control device 60 transmits an assist start permission signal 51 to the first reaction force controller 51A of the steering control device 50. When the start of the electric power generation by the generator 72 is detected (step S102), the vehicle control device 60 transitions to a state of waiting for travel permission (step S104). Thereafter, the vehicle control device 60 determines whether or not the vehicle is permitted to travel (step S105).

The first reaction force controller 51A executes the initial check when the activation switch 73 is turned on (step S201). After the execution of the initial check is completed, the first reaction force controller 51A waits for completion of preparation for traveling of the vehicle (step S202). The first reaction force controller 51A transitions to an assist start state when the assist start permission signal S1 is received in the state of waiting for the completion of preparation for traveling of the vehicle (step S203). The first reaction force controller 51A transmits the charge start permission signal S2 to the control circuit 70C of the power source device 70 when the transition to the assist start state is performed. Thereafter, the first reaction force controller 51A determines whether or not the main power source 71 can be backed up by the auxiliary power source 70A (step S204).

The control circuit 70C of the power source device 70 executes the initial check when the activation switch 73 is turned on (step S301). After the execution of the initial check is completed, the control circuit 70C waits for the transition of the state of the first reaction force controller 51A to the assist start state (step S302). When the charge start permission signal S2 is received in a state of waiting for the transition of the state of the first reaction force controller 51A to the assist start state, the control circuit 70C checks the charge state of the auxiliary power source 70A (step S303) and determines whether or not the charge amount in the auxiliary power source 70A is sufficient to back up the main power source 71 (step S304).

When determination is made that the charge amount in the auxiliary power source 70A is not sufficient (NO in step S304), the control circuit 70C starts to charge the auxiliary power source 70A and waits until the charge amount in the auxiliary power source 70A reaches a sufficient amount. When determination is made that the charge amount in the auxiliary power source 70A is not sufficient (NO in step S304), the control circuit 70C transmits a flag F10 to the first reaction force controller 51A. The flag F10 is information indicating that the main power source 71 cannot be backed up by the auxiliary power source 70A.

When determination is made that the charge amount in the auxiliary power source 70A is sufficient (YES in step S304), the control circuit 70C recognizes that there is a state where the main power source 71 can be backed up by the auxiliary power source 70A (step S305). When determination is made that the charge amount in the auxiliary power source 70A is sufficient (YES in step S304), the control circuit 70C transmits a flag F11 to the first reaction force controller 51A. The flag F11 is information indicating that the main power source 71 can be backed up by the auxiliary power source 70A.

When the flag F10 is received, the first reaction force controller 51A determines that the main power source 71 cannot be backed up by the auxiliary power source 70A (NO in step S204). When determination is made that the main power source 71 cannot be backed up by the auxiliary power source 70A, the first reaction force controller 51A transmits a flag F20 to the vehicle control device 60. The flag F20 is information indicating that the vehicle is not permitted to travel.

When the flag F11 is received, the first reaction force controller 51A determines that the main power source 71 can be backed up by the auxiliary power source 70A (YES in step S204). When determination is made that the main power source 71 can be backed up by the auxiliary power source 70A, the first reaction force controller 51A transmits a flag F21 to the vehicle control device 60. The flag F21 is information indicating that the vehicle is permitted to travel.

When flag F20 is received, the vehicle control device 60 determines that the vehicle is not permitted to travel (NO in step S105), and maintains the vehicle in an untravelable state where the vehicle cannot travel (step S106). The vehicle control device 60 maintains, for example, the shift lock mechanism in a locked state. Accordingly, the vehicle is maintained in a state where the vehicle cannot travel. Further, when determination is made that the vehicle is not permitted to travel (NO in step S105), the vehicle control device 60 notifies the driver of that fact (step S107). The vehicle control device 60 lights an indicator provided, for example, on a meter panel at the driver's seat. With visual recognition of the indicator, the driver can recognize that there is a state where the vehicle is not permitted to travel. The indicator is one of the in-vehicle apparatuses 62.

When the flag F21 is received, the vehicle control device 60 determines that the vehicle is permitted to travel (YES in step S105), and recognizes that the vehicle is in the travelable state (step S103). When determination is made that the vehicle is permitted to travel, the vehicle control device 60 unlocks the shift lock mechanism. Accordingly, the shift lever can be operated and the vehicle can travel. The vehicle control device 60 controls the traveling of the vehicle according to the vehicle operation of the driver. Further, when determination is made that the vehicle is permitted to travel, the vehicle control device 60 turns off the indicator indicating that there is a state where the vehicle is not permitted to travel. With visual recognition of the indicator, the driver can recognize that the vehicle is in a state of being permitted to travel.

Effect of Embodiment

Therefore, according to the present embodiment, the following effects can be obtained. When the first reaction force controller 51A is activated with the vehicle activation operation (here, the turn-on operation of the activation switch 73) as a trigger and transitions to the assist start state, the first reaction force controller 51A waits until the auxiliary power source 70A is charged to the extent that the main power source 71 can be backed up and permits the vehicle to travel. The assist start state is a state where the control of the reaction force motor 31, which is a control target of the first reaction force controller 51A, can be executed. Therefore, the vehicle is not permitted to travel until the auxiliary power source 70A is charged to the extent that the main power source 71 can be backed up. Therefore, it is possible to avoid the traveling start of the vehicle in a state where the auxiliary power source 70A cannot back up the main power source 71. It is also possible to ensure the reliability of the operation of the steering device 10.

The first reaction force controller 51A permits the charge of the auxiliary power source 70A when the transition to the state where the control of the reaction force motor 31 can be executed is performed. Therefore, it is possible to suppress the traveling permission for the vehicle even though the first reaction force controller 51A is not in the state where the control of the reaction force motor 31 can be executed.

The first reaction force controller 51A is activated with the vehicle activation operation as a trigger and then transitions to the state where the control of the reaction force motor 31 can be executed with the start of the electric power generation of the generator 72 as a trigger. Since the generator 72 starts generating the electric power and then the charge of the auxiliary power source 70A is started, consumption of the main power source 71 is suppressed. This is because the electric power generated by the generator 72 is charged to the main power source 71.

The power source system is configured of the main power source 71 mounted on the vehicle, the auxiliary power source 70A that backs up the main power source 71, and the steering control device 50. With the power source system including the steering control device 50, it is possible to avoid the traveling start of the vehicle in the state where the auxiliary power source 70A cannot back up the main power source 71.

The power source system has the control circuit 70C. The control circuit 70C functions as the monitoring circuit that monitors the charge state of the auxiliary power source 70A and determines whether or not the charge state of the auxiliary power source 70A is the state where the main power source 71 can be backed up. The first reaction force controller 51A recognizes whether or not the auxiliary power source 70A is charged to the extent that the main power source 71 can be backed up based on the determination result of the control circuit 70C. Since the control circuit 70C determines whether or not the charge state of the auxiliary power source 70A is the state where the main power source 71 can be backed up, the first reaction force controller 51A does not need to monitor the charge state of the auxiliary power source 70A. It is possible to reduce the calculation load of the first reaction force controller 51A by that much.

The vehicle has the shift lever, which is an operation apparatus that is operated when the vehicle travels, and the vehicle control device 60 that controls the vehicle based on the operation of the shift lever. The vehicle control device 60 locks or disables the operation of the shift lever when the first reaction force controller 51A does not permit the vehicle to travel. Therefore, when the first reaction force controller 51A does not permit the vehicle to travel, that is, when the auxiliary power source 70A is not charged to the extent that the main power source 71 can be backed up, the vehicle does not start to travel.

The vehicle has the indicator. The vehicle control device 60 lights the indicator when the first reaction force controller 51A does not permit the vehicle to travel. Therefore, with the visual recognition of the indicator, the driver can recognize whether or not the vehicle is in the state of being permitted to travel.

OTHER EMBODIMENTS

The present embodiment may be implemented with the following changes. In step S106 of FIG. 4, the vehicle control device 60 maintains the shift lock mechanism in the locked state to maintain the vehicle in the untravelable state, but the following may be employed. For example, the vehicle control device 60 may disable an operation of an accelerator pedal instead of maintaining the shift lock mechanism in the locked state or in addition to maintaining the shift lock mechanism in the locked state. In this manner, even when the driver depresses the accelerator pedal, the state where the vehicle does not travel is obtained. The vehicle control device 60 may maintain the accelerator pedal in the locked state instead of maintaining the shift lock mechanism in the locked state or in addition to maintaining the shift lock mechanism in the locked state. In this manner, the driver cannot depress the accelerator pedal. Therefore, the vehicle cannot travel. The accelerator pedal is an operation apparatus that is operated when the vehicle travels.

In the present embodiment, the first reaction force controller 51A permits the vehicle to travel based on the charge state of the auxiliary power source 70A, but the first turning controller 52A may permit the vehicle to travel. In this case, in the sequence diagram of FIG. 4, the first reaction force controller 51A is replaced with the first turning controller 52A. Further, the reaction force motor 31 is replaced with the turning motor 41. The second reaction force controller 51B or the second turning controller 52B may permit the vehicle to travel.

In the present embodiment, the reaction force motor 31 and the turning motor 41 have the two winding groups, but may have one winding group. In this case, the reaction force control device 51 may have solely any one of the first reaction force controller 51A or the second reaction force controller 51B. Further, in this case, the turning control device 52 may have solely any one of the first turning controller 52A or the second turning controller 52B. The first reaction force controller 51A or the second reaction force controller 51B corresponds to the reaction force controller. The first turning controller 52A or the second turning controller 52B corresponds to the turning controller.

The steering device 10 may be an electric power steering device. The electric power steering device is formed by mechanically connecting the steering wheel 11 and the turning wheels 16 shown in FIG. 1. That is, the steering shaft 12, the pinion shaft 13, and the turning shaft 14 function as a power transmission path between the steering wheel 11 and the turning wheels 16. The turning angle $\theta_w$ of the turning wheels 16 is changed by the linear movement of the turning shaft 14 as the steering wheel 11 is steered.

The electric power steering device has an assist motor and an assist control device. The assist motor is provided at the same position as the reaction force motor 31 or the turning motor 41 shown in FIG. 1. The assist motor generates assist force for assisting the operation of the steering wheel 11. The assist force is a torque in the same direction as the steering direction of the steering wheel 11. The assist control device corresponds to the steering control device. The assist control device controls driving of the assist motor, which is a control target. The assist control device has the same configuration as the reaction force control device 51 or the turning control device 52 shown in FIG. 2.

What is claimed is:

1. A steering control device comprising a controller configured to control driving of a motor that generates a torque, the torque being a torque applied to a steering mechanism of a vehicle using electric power from at least any one of an in-vehicle main power source and an auxiliary power source that backs up the main power source,
    wherein the controller is configured to wait for the auxiliary power source to be charged to an extent that the main power source is able to be backed up and to permit the vehicle to travel when the controller is activated with an activation operation for the vehicle as a trigger and transitions to a state where control of the motor is executable.

2. The steering control device according to claim 1, wherein the controller is configured to permit the charge of the auxiliary power source when the controller transitions to the state where the control of the motor is executable.

3. The steering control device according to claim 1, wherein:
    the main power source is configured to be charged with electric power generated by an in-vehicle generator, and the auxiliary power source is configured to be charged with the electric power from the main power source; and
    the controller is configured to be activated with the activation operation for the vehicle as a trigger and then to transition to the state where the control of the motor is executable with a start of the power generation by the generator as a trigger.

4. A power source system comprising:
a main power source mounted on a vehicle;
an auxiliary power source configured to back up the main power source;
a steering control device including a controller configured to control driving of a motor that generates a torque, the torque being a torque applied to a steering mechanism of the vehicle using electric power from at least any one of the in-vehicle main power source and the auxiliary power source that backs up the main power source,
wherein the controller is configured to wait for the auxiliary power source to be charged to an extent that the main power source is able to be backed up and to permit the vehicle to travel when the controller is activated with an activation operation for the vehicle as a trigger and transitions to a state where control of the motor is executable.

5. The power source system according to claim 4, further comprising a monitoring circuit configured to monitor a charge state of the auxiliary power source and to determine whether or not the charge state of the auxiliary power source is a state where the main power source is able to be backed up,
wherein the controller is configured to recognize whether or not the auxiliary power source is charged to the extent that the main power source is able to be backed up, based on a determination result of the monitoring circuit.

6. A vehicle comprising:
an operation apparatus operated when the vehicle travels;
a vehicle control device configured to control the vehicle based on the operation of the operation apparatus; and
a power source system, wherein:
the power source system includes a main power source mounted on the vehicle, an auxiliary power source configured to back up the main power source, and a steering control device including a controller configured to control driving of a motor that generates a torque;
the torque is a torque applied to a steering mechanism of the vehicle using electric power from at least any one of the in-vehicle main power source and the auxiliary power source that backs up the main power source;
the controller is configured to wait for the auxiliary power source to be charged to an extent that the main power source is able to be backed up and to permit the vehicle to travel when the controller is activated with an activation operation for the vehicle as a trigger and transitions to a state where control of the motor is executable; and
the vehicle control device is configured to lock or disable the operation of the operation apparatus when the steering control device does not permit the vehicle to travel.

7. The vehicle according to claim 6, wherein the operation apparatus is a shift lever that is operated when a shift range of a transmission mounted on the vehicle is switched.

8. The vehicle according to claim 6 further comprising an indicator,
wherein the vehicle control device is configured to light the indicator when the steering control device does not permit the vehicle to travel.

* * * * *